United States Patent
Choi et al.

(10) Patent No.: US 7,557,486 B2
(45) Date of Patent: Jul. 7, 2009

(54) DUAL ROTOR TYPE MOTOR

(75) Inventors: Soung Bong Choi, Changwon-si (KR); Seong Hai Jeong, Changwon-si (KR); Yeong Soo Kim, Changwon-si (KR); Hung Myong Cho, Gimhae-si (KR); In Geun Ahn, Changwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/592,684

(22) PCT Filed: Jan. 17, 2006

(86) PCT No.: PCT/KR2006/000171

§ 371 (c)(1),
(2), (4) Date: May 14, 2007

(87) PCT Pub. No.: WO2006/075903

PCT Pub. Date: Jul. 20, 2006

(65) Prior Publication Data
US 2007/0205682 A1 Sep. 6, 2007

(30) Foreign Application Priority Data

| Jan. 17, 2005 | (KR) | 10-2005-0004169 |
| Jan. 17, 2005 | (KR) | 10-2005-0004170 |
| Jan. 19, 2005 | (KR) | 10-2005-0004984 |

(51) Int. Cl.
*H02K 1/22* (2006.01)
(52) U.S. Cl. .................. 310/266; 310/154.33
(58) Field of Classification Search .......... 310/266, 310/114, 154.33, 154.36, 258, 259
See application file for complete search history.

(56) References Cited

U.S. PATENT DOCUMENTS

| 4,731,554 | A  * | 3/1988 | Hall et al. ............... 310/67 R |
| 5,783,894 | A  * | 7/1998 | Wither .................... 310/266 |
| 6,396,190 | B1 * | 5/2002 | Ahn et al. ................ 310/261 |
| 6,992,419 | B2 * | 1/2006 | Kim et al. ................ 310/266 |
| 7,380,424 | B2 * | 6/2008 | Kim et al. ................. 68/140 |
| 7,411,330 | B2 * | 8/2008 | Kaneko ................... 310/266 |
| 2004/0163428 | A1 * | 8/2004 | Kim et al. ................. 68/140 |
| 2004/0245878 | A1 * | 12/2004 | Kim et al. ................ 310/114 |
| 2008/0122300 | A1 * | 5/2008 | Cho et al. ................. 310/43 |

FOREIGN PATENT DOCUMENTS

| EP | 1 094 145 | 8/2000 |
| KR | 10-2004-0002349 | 1/2004 |
| KR | 10-2004-0045732 | 6/2004 |
| KR | 10-2005-0000245 | 1/2005 |
| WO | WO 2004/004098 | 1/2004 |

OTHER PUBLICATIONS

International Search Report dated Mar. 9, 2009.

* cited by examiner

*Primary Examiner*—Hae Moon Hyeon
(74) *Attorney, Agent, or Firm*—Ked & Associates LLP

(57) ABSTRACT

A dual rotor-type motor includes a stator located between inner and outer rotors. The stator includes a core having first and second surfaces that face magnets on respective circumferential surfaces of the rotors. The surfaces of the core are spaced predetermined distances from the magnets on thr rotors and an insulating material can be included around the core.

47 Claims, 15 Drawing Sheets

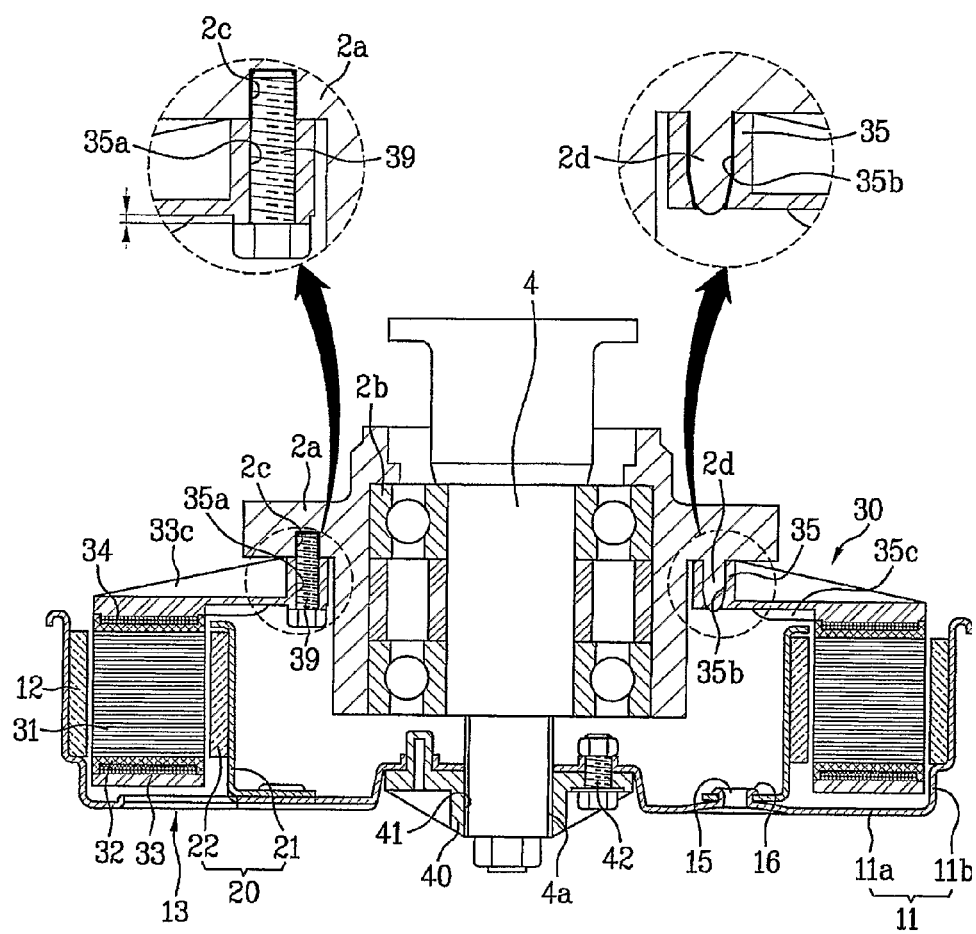
[Fig. 3]

[Fig. 4]
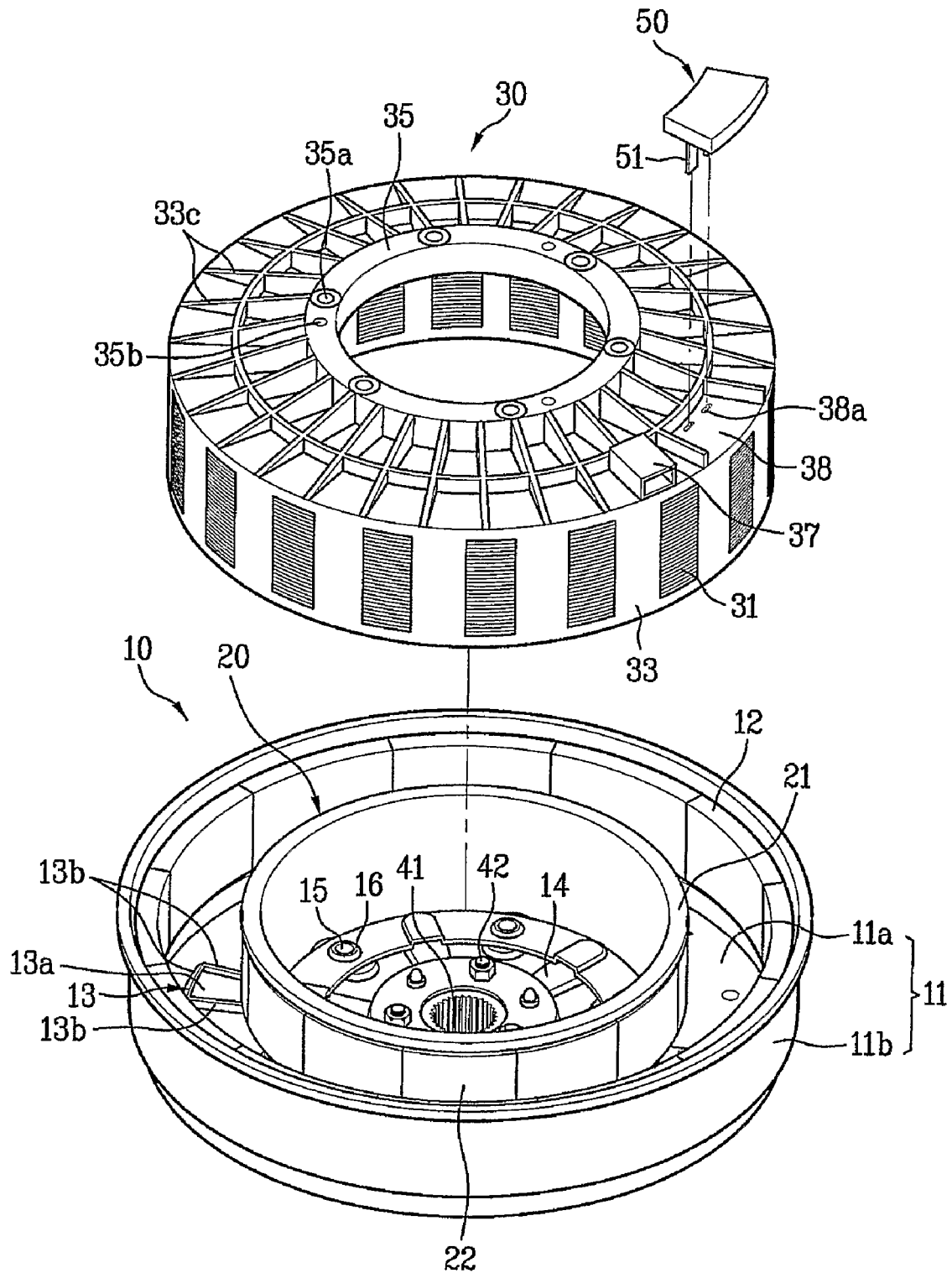

[Fig. 5]
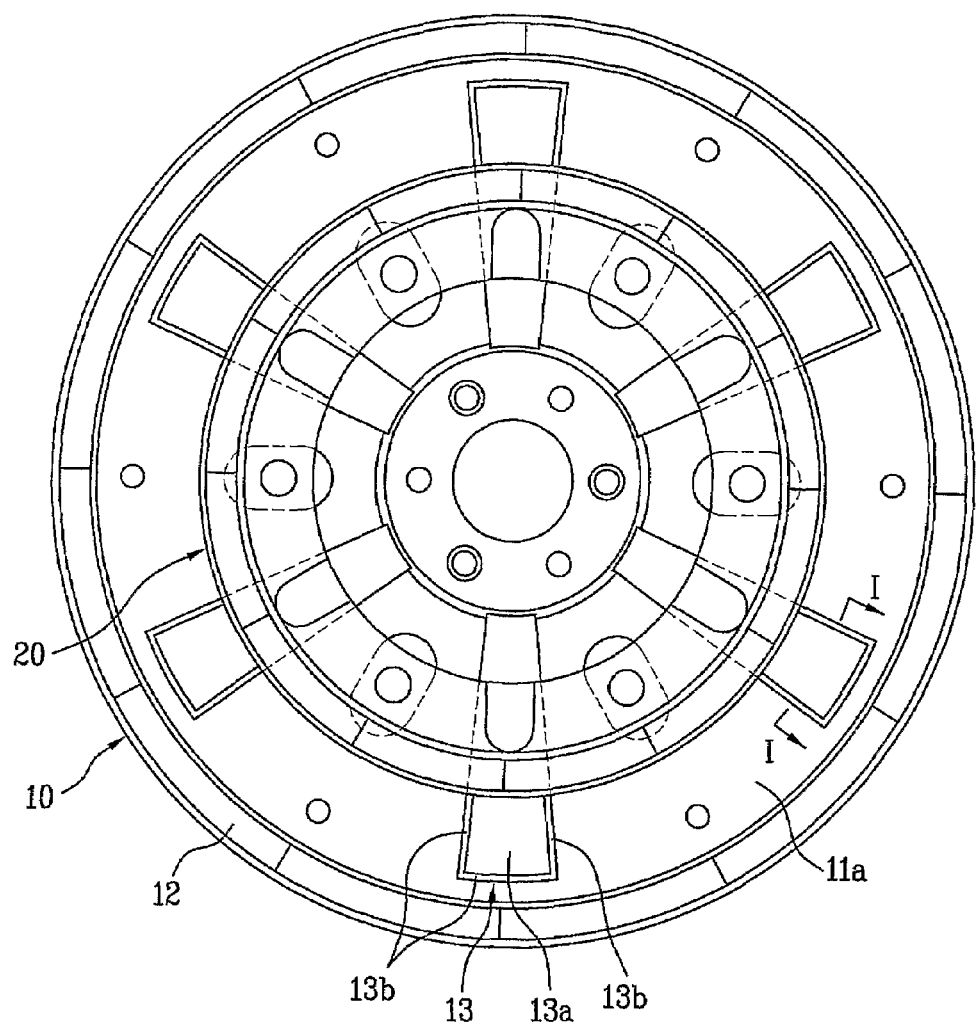
[Fig. 6]
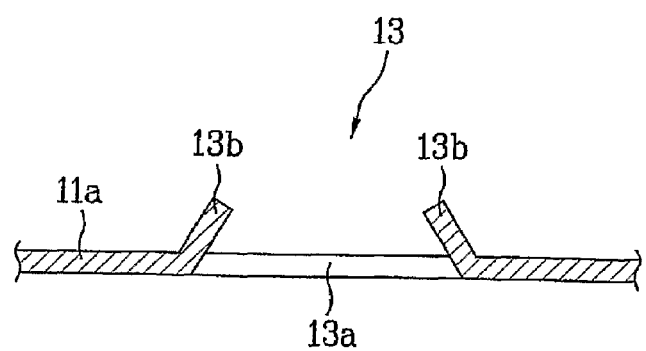

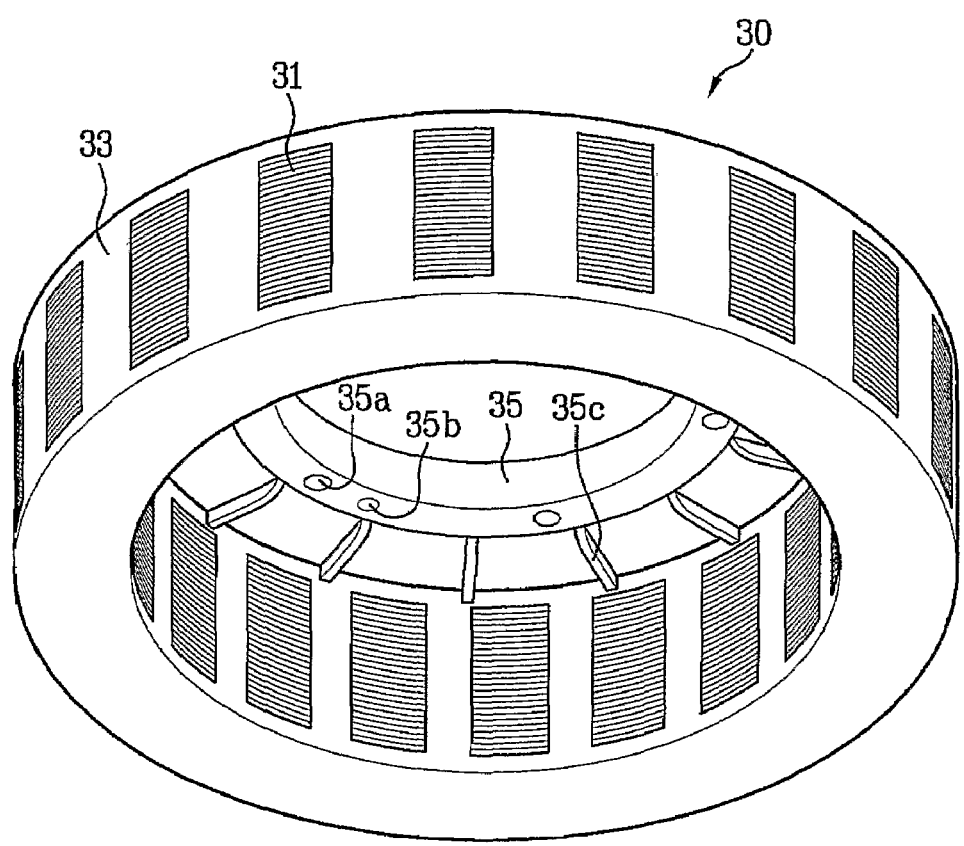
[Fig. 7]

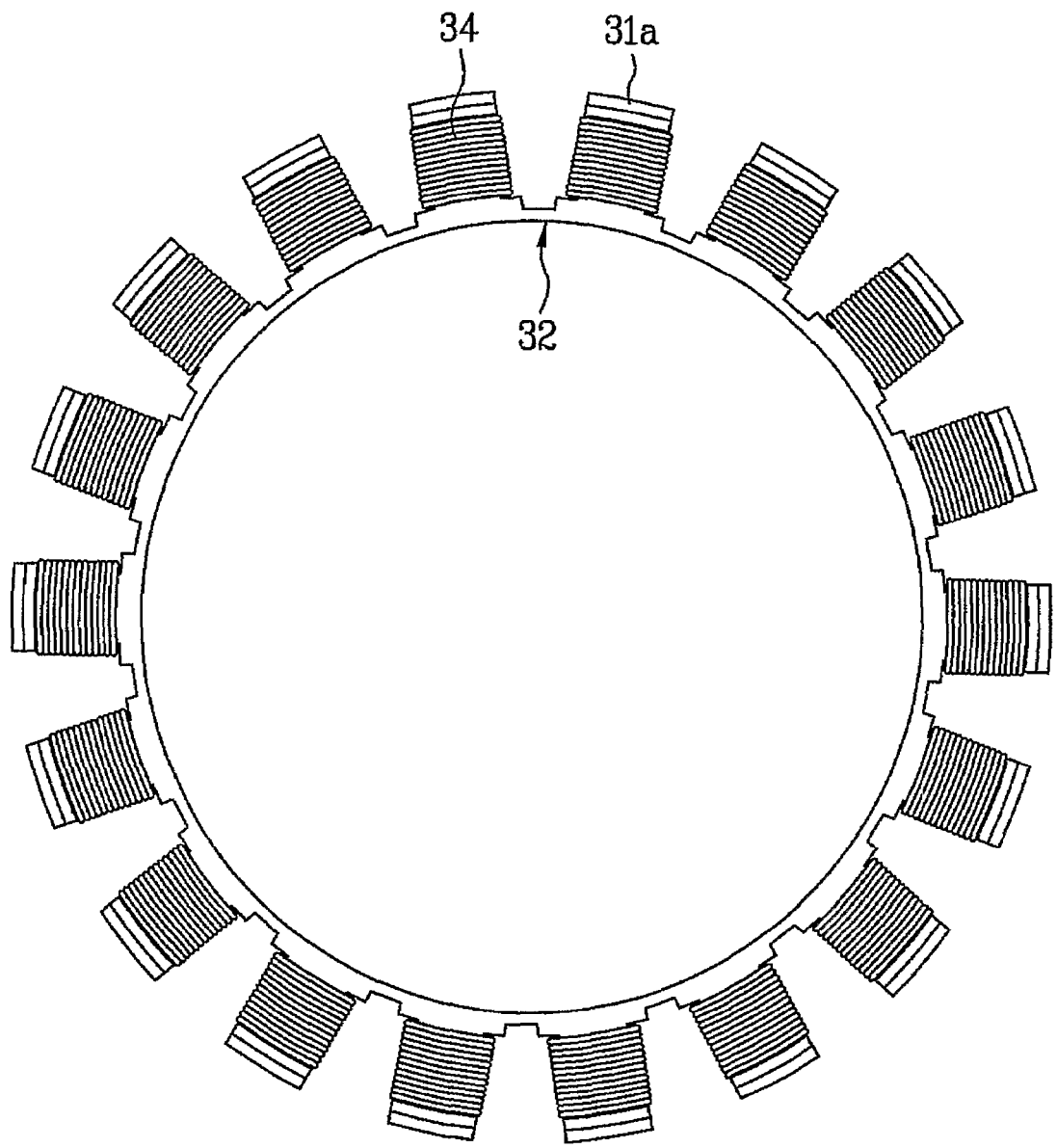
[Fig. 8]

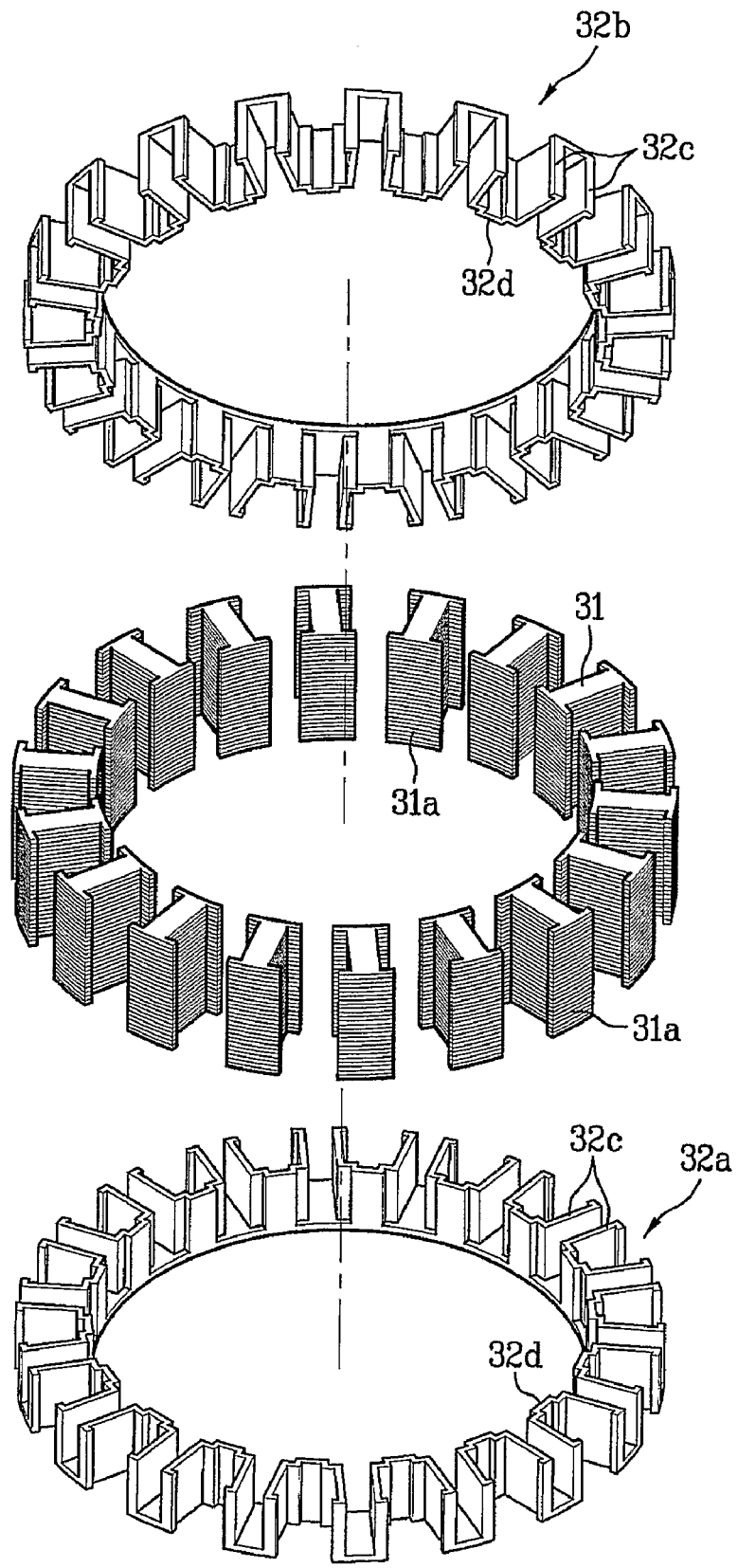
[Fig. 9]

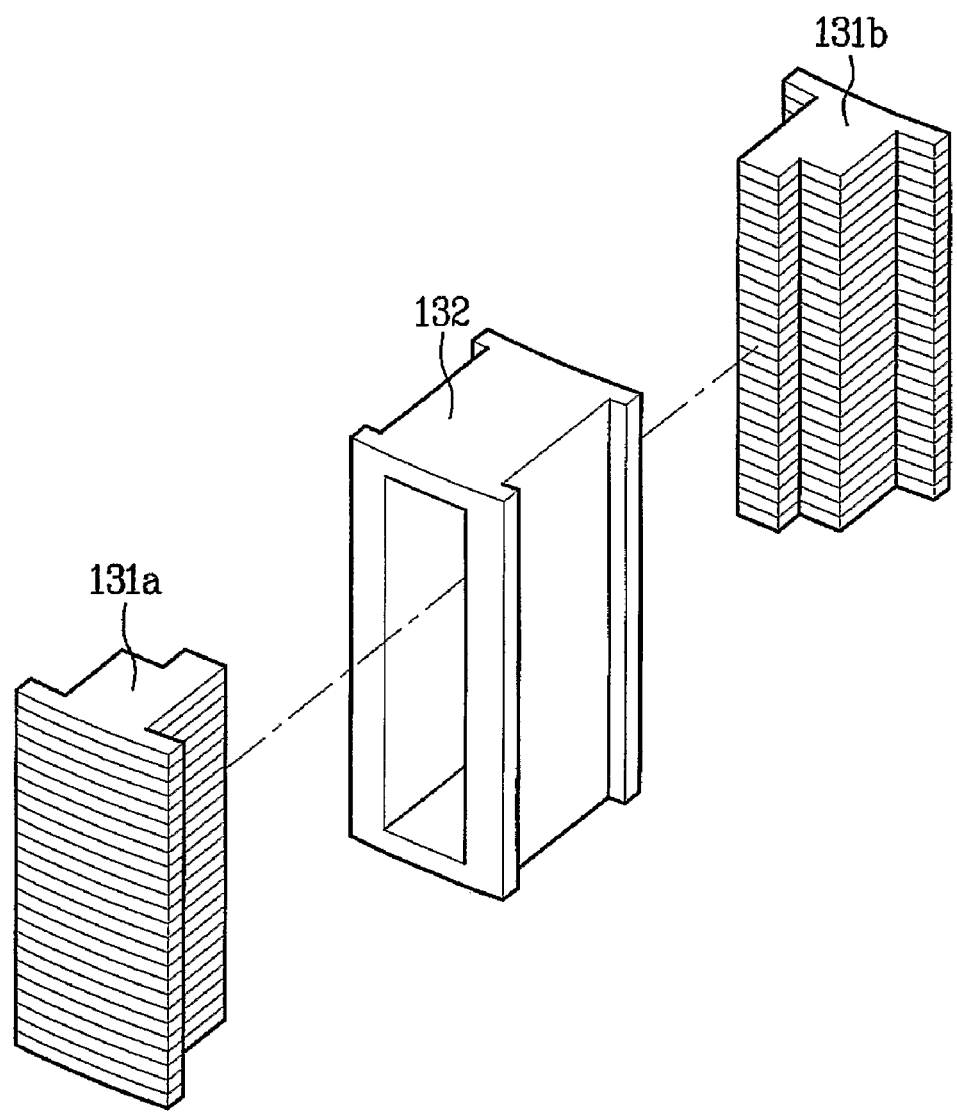
[Fig. 10]

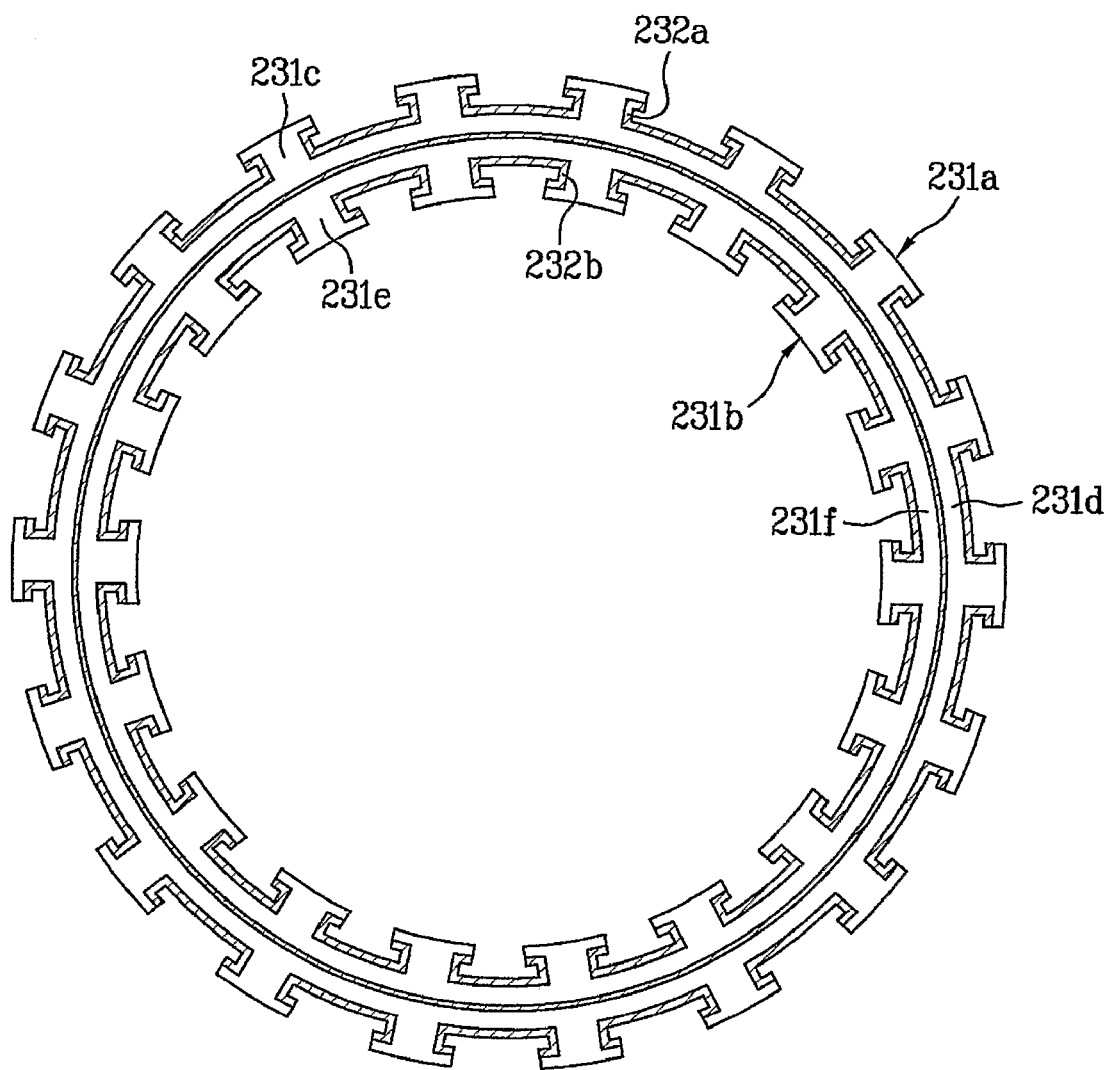

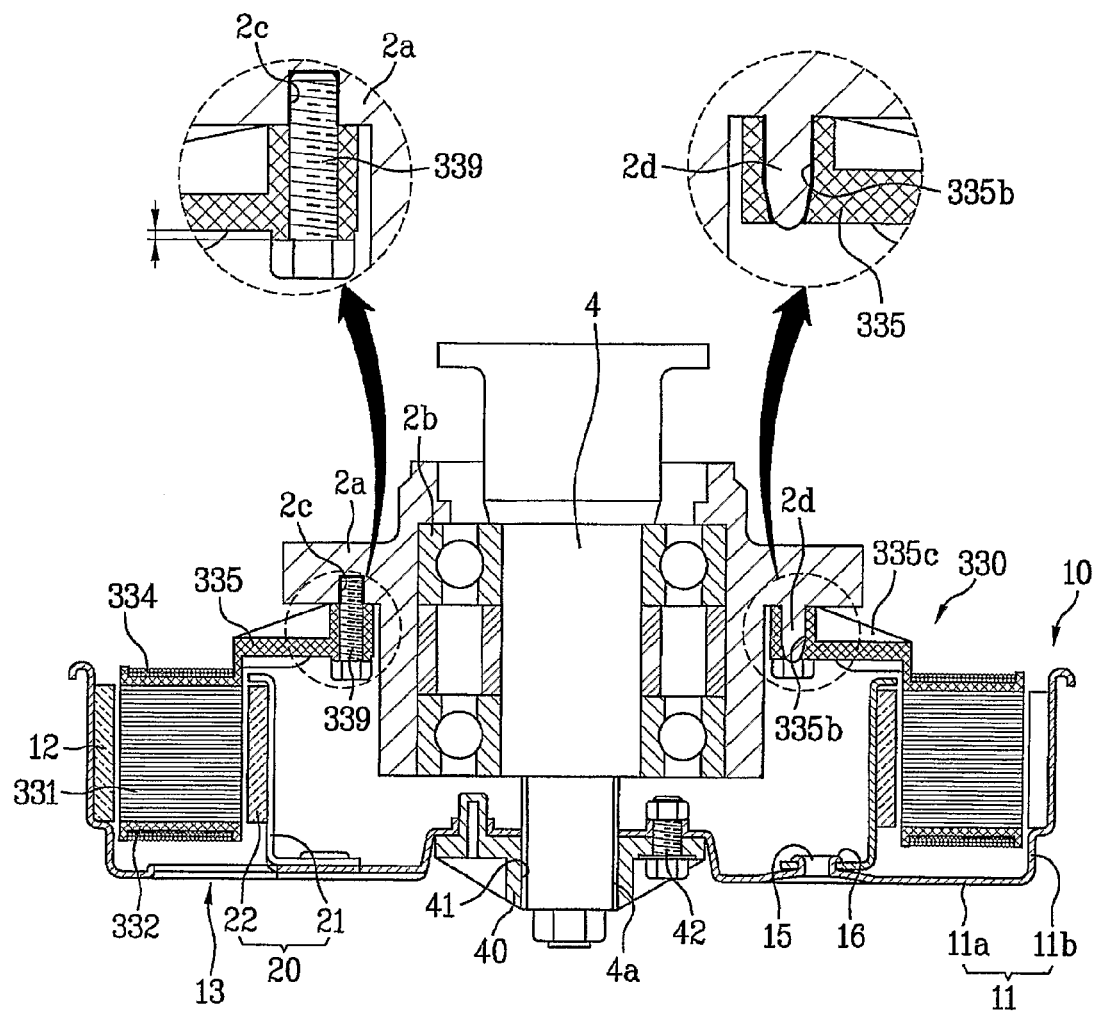
[Fig. 12]

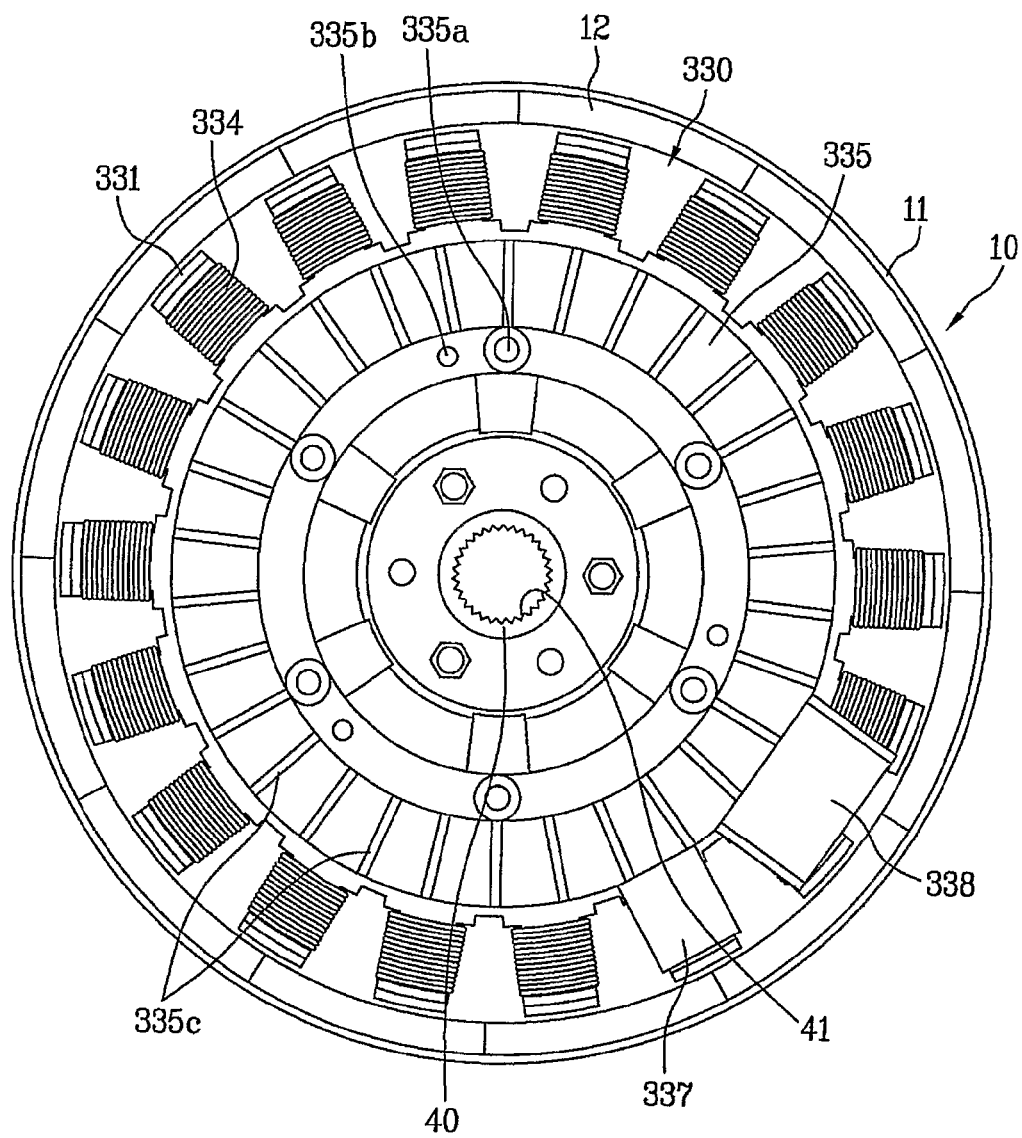
[Fig. 13]

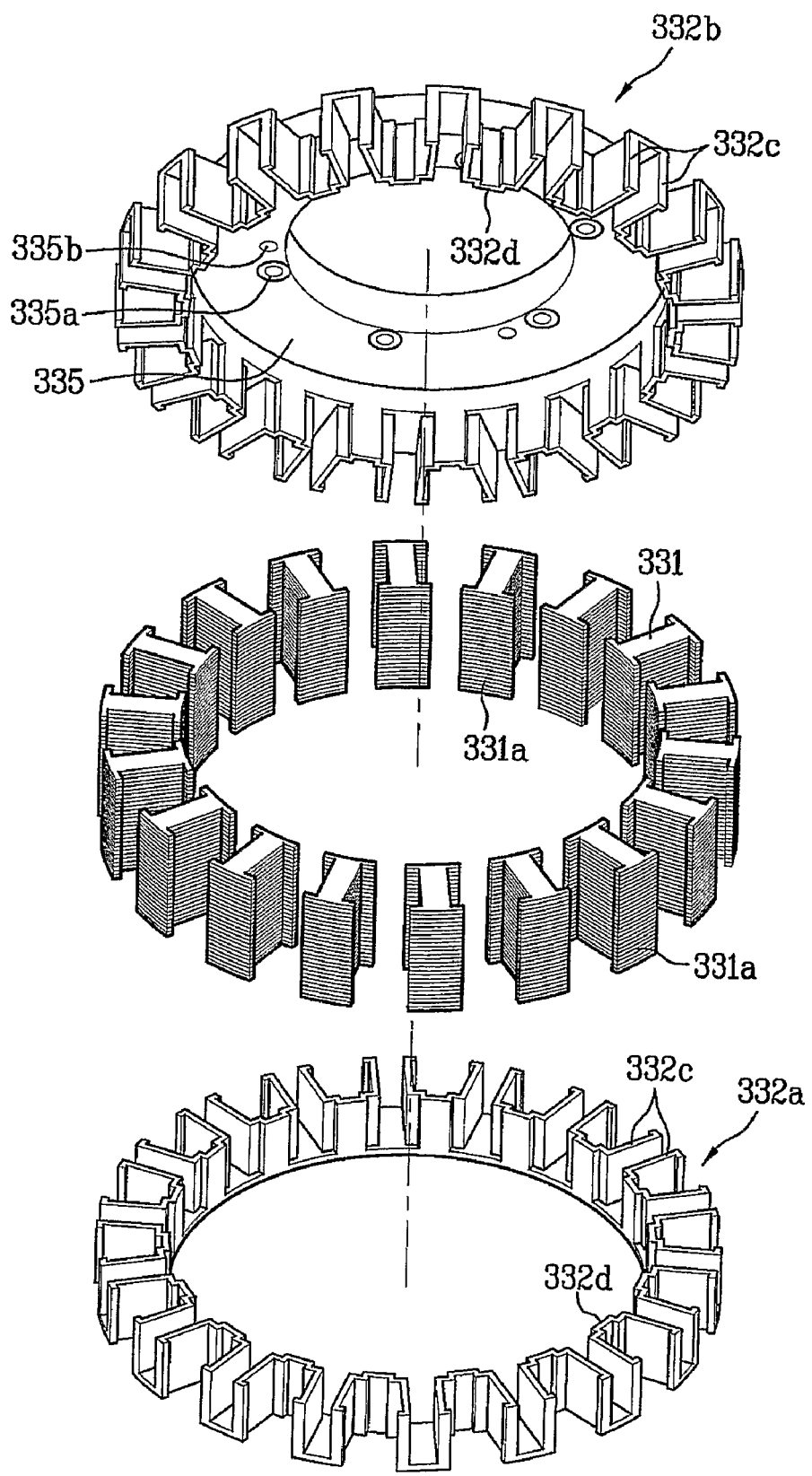
[Fig. 14]

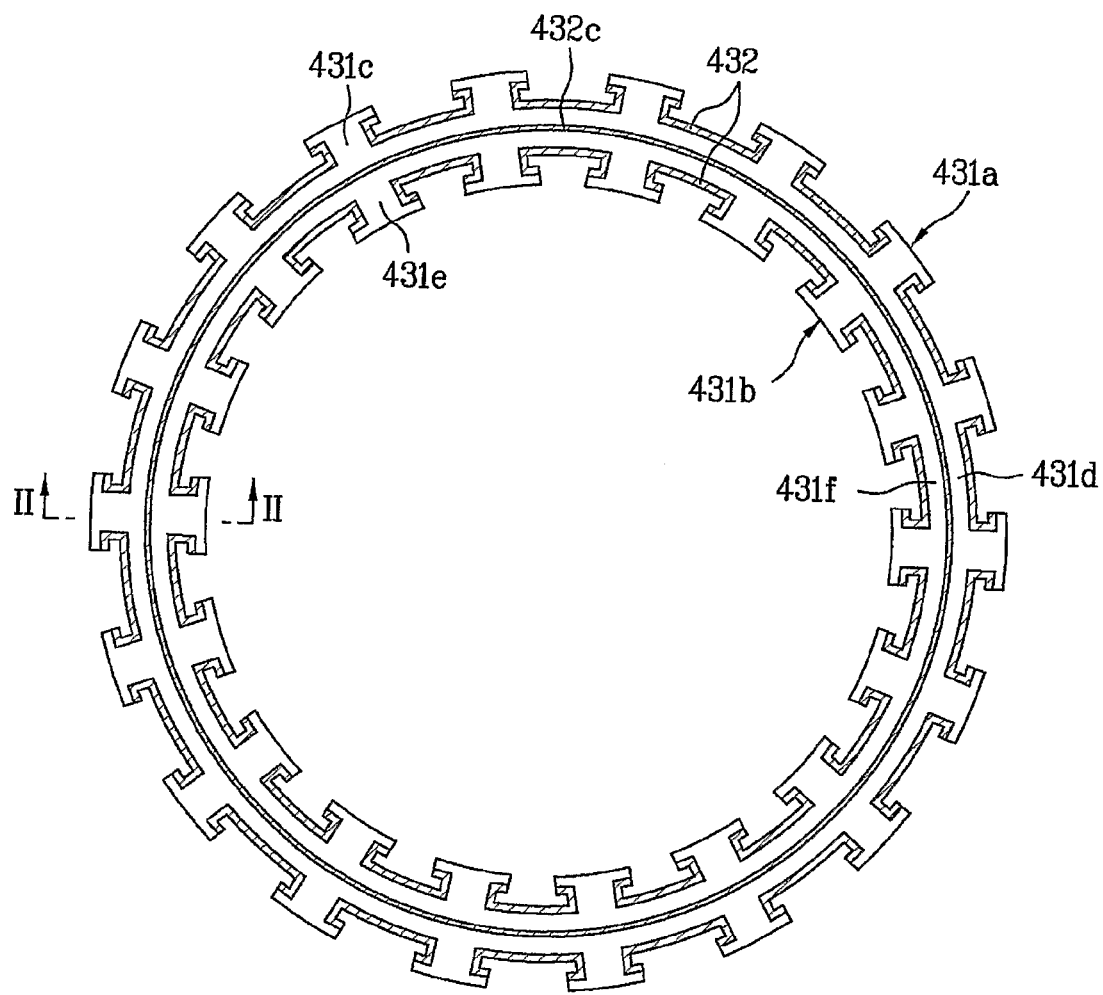
[Fig. 15]

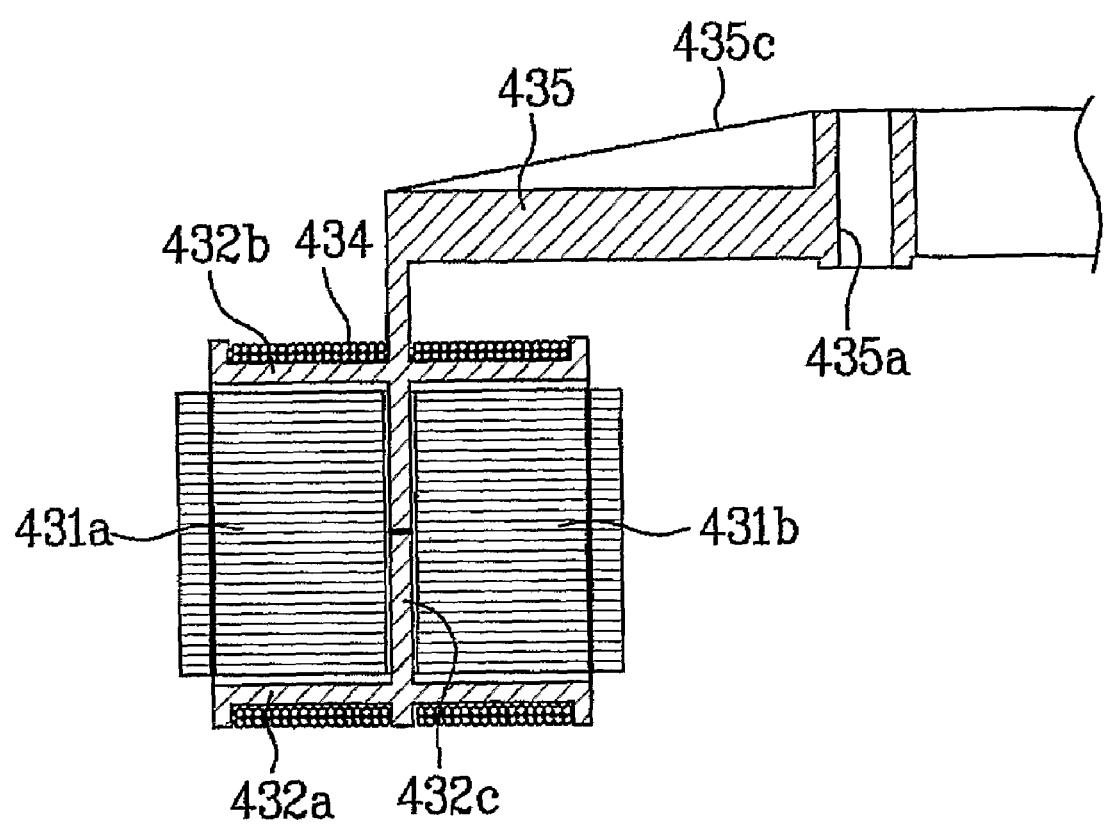
[Fig. 16]

DUAL ROTOR TYPE MOTOR

CROSS-REFERENCE TO RELATED APPLICATIONS

The application claims priority to International Application PCT/KR06/00171 filed on Jan. 17, 2006, the contents of which are incorporated herein by reference.

TECHNICAL FIELD

The present invention relates to a motor, and more particularly, to a dual rotor type brushless DC (hereinafter, BLDC) motor which improves torque by means of dually mounting rotors in both sides of a stator of an appliance such as a washing machine.

BACKGROUND ART

In general, according to a drum type washing method, detergent, washing water and the laundry are introduced and washing is performed by using a friction power between a rotating drum and the laundry after receiving a drive force of a motor. Thereby, the drum type washing method has not only an enhanced washing efficiency but also little laundry damage and laundry tangle.

According to a driving method of a motor thereof, a conventional drum type washing machine is classified into an indirect drive type in which driving force of a motor is indirectly transmitted to a drum through a belt tied around a motor pulley and a drum pulley, and a direct drive type in which driving force of a motor is directly transmitted to a drum by reason that a rotor of a BLDC motor is directly connected to a drum.

However, the indirect method has some problems of energy loss and a lot of noise, which are caused in a process transmitting the driving force.

Demands for direct drive type drum-type washing machine using a BLDC motor have been increasing accordingly so as to solve the above problems.

Referring to FIG. 1, a related art drum type washing machine will be described.

As shown in FIG. 1, a tub 2 is mounted within a cabinet 1, and a drum 3 is rotatably mounted in a center of the tub 2.

A motor having a stator 6 and a rotor 5 is mounted in rear of the tub 2. The stator 6 is secured on a rear wall of the tub, and the rotor 5 passes through the tub and is connected to the drum 3 by a shaft with covering the stator 6. Magnets are alternatively provided on an inner circumferential surface of the rotor 5 in opposite poles.

A tub supporter made of metal (not shown) which has almost the same appearance of an exterior of the rear wall of the tub 2 is interposed between the rear wall of the tub and the stator for maintaining concentricity of the stator as well as supporting load of the stator by being secured to the rear wall of the tub.

On the other hand, a door 7 is provided in front of the cabinet 1, and a gasket 8 is provided between the door 7 and the tub 2.

Also, a suspension spring 9a is provided between an inner surface of the cabinet's upper portion and an outer circumferential surface of the tub's upper portion for supporting the tub 2. A friction damper 9b is provided between an inner surface of the cabinet's lower portion and an outer circumferential surface of the tub's lower portion for dampening vibration of the tub 2 generated in a spinning cycle.

FIG. 2 is an enlarged sectional view of the motor. The stator 6 is secured to a bearing housing 2a on a rear surface of the tub 2, and the rotor 5 is rotoatably mounted in an outer of the stator 6. A first end of a shaft 4 is secured to a center of the rotor 5, and a second thereof is secured to a rear surface of the drum 3. A permanent magnet 5a is mounted on the inner circumferential surface of the rotor 5, and the stator 6 is employed as an electromagnet due to a core and a coil wound on an outer circumferential surface of the core.

Hence, once power is supplied to the coil, the rotor 5 rotates due to rotating magnetic field created between the permanent magnet and the electromagnet, and rotation torque of the rotor 5 is transmitted to the drum 3 through the shaft 4.

However, the above related art motor has a limitation of increasing output and power, because it uses one rotor.

In other words, output torque and power of a motor should be increased to rotate a drum of a washing machine as capacity thereof is enlarged. Hence, the size of the rotor and stator is also enlarged so as to increase the output of the motor. Thereby, it may cause a problem that size and weight of a motor should be increased.

DISCLOSURE OF INVENTION

Technical Problem

An object of the present invention devised to solve the problem is to provide a dual rotor motor having an efficient structure which can magnificently enhance output of a motor without increasing a size and weight thereof.

Technical Solution

To achieve these objects and other advantages and in accordance with the purpose of the invention, as embodied and broadly described herein, a dual rotor type motor includes a shaft rotatably provided in a motor securing part of an appliance; a rotor assembly rotated with a center thereof fastened to the shaft, the rotor assembly comprising an outer rotor spaced from the center of the shaft a predetermined distance with magnets secured along a circumferential direction, and an inner rotor provided in an inside of the outer rotor at a predetermined distance with magnets secured along a circumferential direction; and a stator comprising a core made of metal, an insulator of an insulating material for surrounding the core so as to have a first and second surface of the core facing each other to be exposed outside, a coil wound on the outer surface of the insulator, a molding part of insulating material for surrounding the insulator and the coil by insert molding as one body to expose the first and second surface of the core in a state of the insulator being provided in a circular shape, and a fixing part for securing the molding part to the motor securing part, the stator provided between the outer rotor and the inner rotor for having the exposed first and second surface of the core to face each other at a predetermined distance with the magnet of the outer and inner rotor.

In another aspect of the present invention, a dual rotor type motor includes a shaft rotatably provided in a motor securing part of an appliance; a rotor assembly rotated with a center thereof fastened to the shaft, the rotor assembly comprising an outer rotor from the center of the shaft a predetermined distance with magnets secured along a circumferential direction, and an inner rotor provided in an inside of the outer rotor at a predetermined distance with magnets secured along a circumferential direction; and a stator comprising a core made of metal, an insulator of an insulating material for surrounding the core so as to have a first and second surface of the core facing each other to be exposed outside, a coil wound on the outer surface of the insulator, and a fixing part for securing the insulator to the motor securing part, the stator provided between the outer rotor and the inner rotor for having the exposed first and second surface of the core to face each other at a predetermined distance with the magnets of the outer and inner rotor.

Advantageous Effects

A dual rotor type motor according to the present invention has an advantageous effect that the output of the motor may be enhanced without enlarging the size and weight of the motor, because the inner rotor and the outer rotor are provided in the inner portion and outer portion of the stator according to the present invention.

Furthermore, according to the present invention it is easy to secure the stator to an appliance such as a washing machine, because the core of the stator and the insulator are supported by the molding part.

Still further, in case that the molding part is surrounding the core of the stator, the insulator and the coil, water-proof efficiency of the stator may be enhanced. Thus, when applied to the appliances such as a washing machine using water, there is little short circuit caused by water on the stator and durability of the stator also may be enhanced.

Still further, in case the plurality of the cooling hole parts is formed, air for cooling is ventilated smoothly to radiate the heat of the motor more efficiently even in rotating/reverse-rotating the shaft of the motor by agitating.

Still further, according to the present invention the inner space of the inner rotor may be cooled efficiently, because air can flow into the inner and outer side of the inner rotor through the intervals on the portion having the outer rotor and the inner rotor fastened thereto by the embossing of the base of the outer rotor.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 3 is a longitudinal sectional view schematically illustrating a first embodiment of a dual rotor type motor according to the present invention.

FIG. 4 is an exploded perspective view illustrating the dual rotor type motor according to the present invention.

FIG. 5 is an elevation illustrating a rotor of the dual rotor motor according to the present invention.

FIG. 6 is a sectional view illustrating an I-I line of FIG. 5.

FIG. 7 is a perspective view from another point of view illustrating a stator of the dual rotor type motor of FIG. 3.

FIG. 8 is an elevation illustrating a state without a mold part of the stator of FIG. 7.

FIG. 9 is an exploded perspective view illustrating the state without the mold part of the stator of FIG. 7.

FIG. 10 is an exploded perspective view illustrating another example of the stator of the dual rotor type motor shown in FIG. 3.

FIG. 11 is a transverse sectional view illustrating a third example of the stator of the dual rotor type motor shown in FIG. 3.

FIG. 12 is a sectional view illustrating a second embodiment of a dual rotor type motor according to the present invention.

FIG. 13 is an elevation of the dual rotor type motor of FIG. 12.

FIG. 14 is an exploded perspective view of a stator of the dual rotor type motor of FIG. 12.

FIG. 15 is a transverse section illustrating another embodiment of the stator of the dual rotor type motor shown in FIG. 12.

FIG. 16 is a sectional view of a II-II line of FIG. 15.

DETAILED DECRIPTION

Reference will now be made in detail to the preferred embodiments of the present invention, examples of which are illustrated in the accompanying drawings.

For understanding, the same or similar configurations out of embodiments of the present invention which will be described as follows will be given the same reference numbers and the detailed description thereof will be omitted.

First, referring to FIGS. 3 through 9, a first embodiment of a dual rotor type motor according to the present invention will be described.

For understanding, it is embodied that the dual rotor type motor of the present invention is applied to a washing machine. However, the dual rotor type motor of the present invention may be applied not only to a washing machine but also to other appliances such as an air conditioner.

Figure 1:
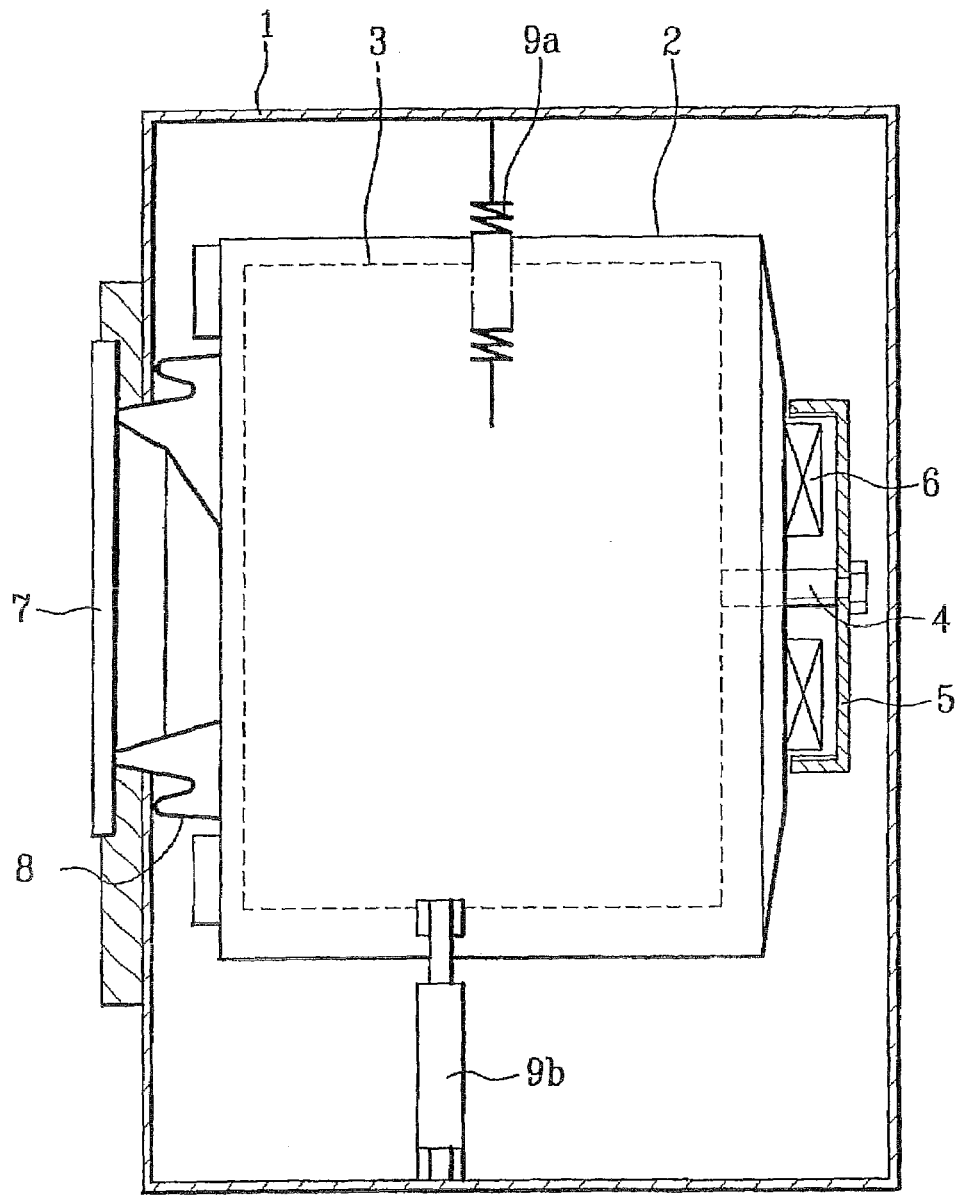
FIG. 1 is a sectional view schematically illustrating a drum type washing machine having a related art outer rotor type motor.
Figure 2:
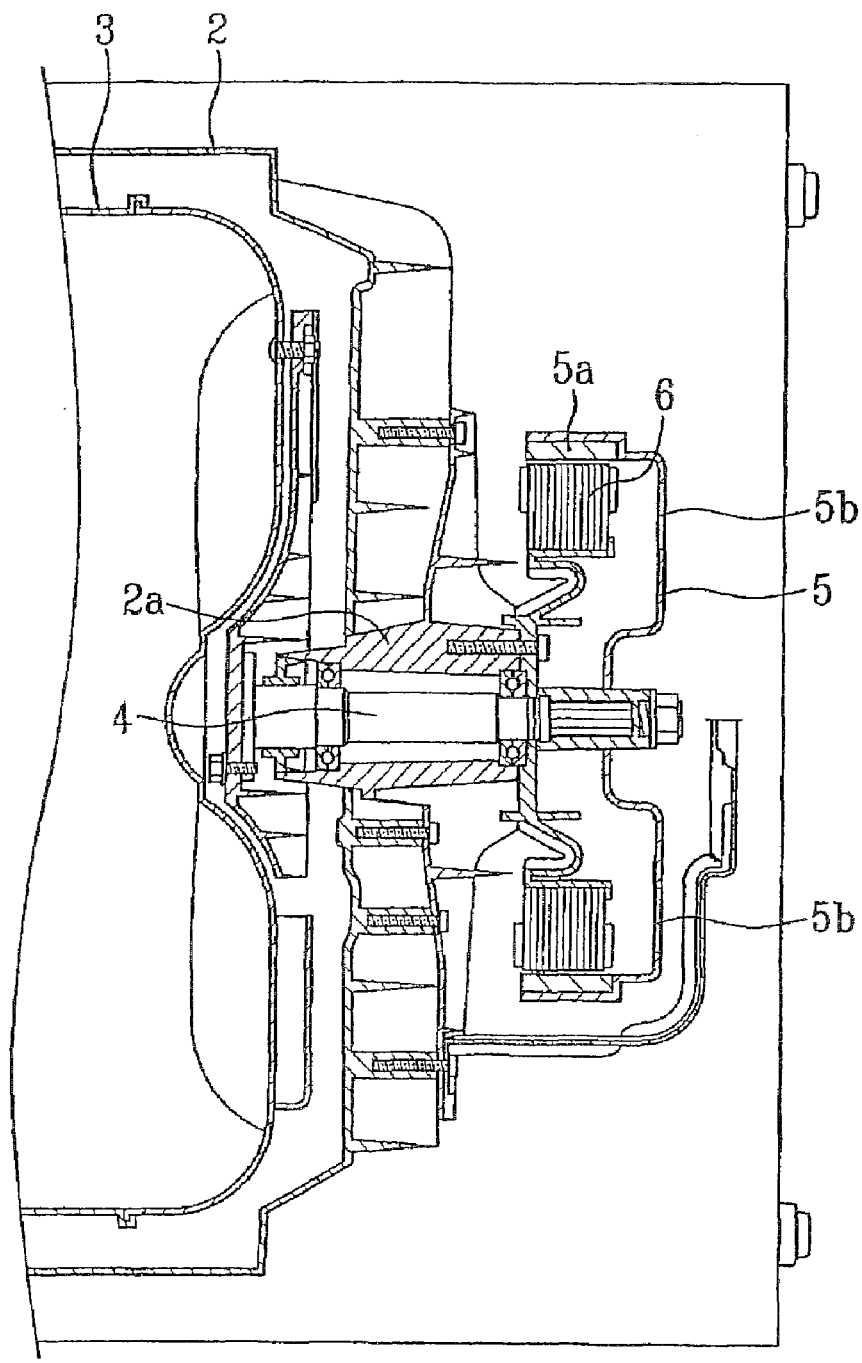
FIG. 2 is an enlarged sectional view illustrating a structure of the related art outer rotor type motor.

As shown in FIGS. 3 and 4, a shaft 4 is rotatably mounted on a rear surface center of a tub 2 (see FIG. 1) for driving a drum 3. The shaft 4 is supported by a bearing 2b within a bearing housing 2a provided in rear of the tub 2.

A motor is mounted on the bearing housing 2a for driving the shaft 4, the motor is provided so as to maintain a predetermined distance between a stator 30 secured on the bearing housing 2a and an inner/outer surface of the stator 30, and there are an outer rotor 10 and an inner rotor 20 having a first/second end of the shaft 4 secured thereto. Preferably, the outer rotor 10 and the inner rotor 20 are made of metal, but may be made of injection molded resin.

The outer rotor 10 is formed as a disk shape and has a bushing 40 of resin material secured to a center thereof. The bushing 40 is fastened to the shaft 4. The bushing 40 is secured to a center of the outer rotor 10 by securing means such as a bolt 42, and may be formed on the outer rotor as one body.

Also, the bushing 40 has a hole the shaft 4 is inserted to and serration part 41 formed on an inner circumferential surface of the hole for being connected with a serration part 4a on an outer circumferential surface of the shaft 4.

Referring to FIGS. 4 and 5, the outer rotor 10 includes an outer rotor frame 11 of a disk shape, an outer magnets 12 having an S-pole and N-pole thereof alternatively disposed in the outer rotor frame 11, and a cooling hole 13. Also, the inner rotor 20 includes an inner rotor frame 21 of an annular shape concentrically secured to the outer rotor 10, and an inner magnets 22 provided along an outer circumferential surface of the inner rotor frame 22. An S-pole and an N-pole of the inner magnets 22 are also alternatively disposed.

The outer rotor frame 11 includes a base 11a, an extension 11b extending from an outer circumferential surface toward a perpendicular direction of the base 11a. Each outer magnets 12 is provided on an inner circumferential surface of the extension 11b along a radius direction.

Preferably, an embossing 14 is formed on the base 11a, which is embossed upwardly at a predetermined height by press finishing. Preferably, a plurality of the embossings 14 is formed along a circumferential direction of the base 11a at a pre-deterined distance.

After the embossing 14 is formed, a caulking hole part 15 is formed by press finishing and caulking at a portion where the embossing 14 and the inner rotor 20 are contacted. Thereby, the inner rotor 20 is secured to an upper surface of the base 11a.

To secure the inner rotor 20 to the upper surface of the base 11a precisely, the portion Where the embossing and the inner rotor 20 are contacted is secured by a caulking hole part 15. Preferably, the caulking hole part 15 is formed by press finisbing, which uses a press die, and caulking. When the outer rotor 10 and the inner rotor 20 are positioned on the press die for forming the caulking hole part 15, the inner circumferential surface of the inner rotor 20 and the outer circumferential surface of the outer rotor are aligned by a align device, and automatically each center thereof is in accordance. That is, the outer rotor 10 and the inner rotor 20 are concentrically secured.

The caulking hole part 15 has a hole passing through a lower surface of the inner rotor 20 from the base 11a, and a rim of the hole is compressed and banded. Thereby, the lower surface of the inner rotor 20 is clapped between a caulking 16 and the base 11a to be secured.

Hence, there is space as high as the embossing 14 between the upper surface of the base 11a and the lower surface of the inner rotor, and air passes through the space. Thereby, the lower space of the inner rotor 20 may be efficiently cooled.

Also, a cooling hole part 13 is provided at the base 11a for allow air cooling the motor to pass through, and preferably the cooling hole part 13 is formed at an exact outside of the outer circumferential surface of the inner rotor 20.

As shown in FIGS. 5 and 6, the cooling hole part 13 includes a cooling hole 13a formed along a circumferential direction of the base 11a at a predetermined distance for allowing air to pass through, and a guide part 13b projected along a rim of the cooling hole 13a at a predetermined height.

When the outer rotor 10 and the inner rotor rotate, air may pass through the cooling hole 13a for being discharged outside of the outer rotor 10 or drawn inside. Also, air in the inner rotor 20 passes through the space between the lower surface of the inner rotor 20 and the base 11a, and after that the air may be discharged outside through the cooling hole 13a. By the above air circulation, heat generated from the motor may be radiated.

Preferably, the guide part 13b is inclined toward an inside of the cooling hole 13a for softening air steam line passing through the cooling hole 13a. A section of the guide part may be formed variously such as a round-shape.

The guide part 13b of the cooling hole part 13 is formed as a separate piece, but preferably as one body with the base 11a, for example, by lancing.

As described above, since the cooling hole part 13 is formed at the outer rotor 10, even in case that the motor rotates/counter-rotates, air is ventilated through the cooling hole part to prevent the motor's overheating.

Referring to FIGS. 3, 4, and 7 through 9, a structure of the stator 30 will be described as follows. The stator 30 includes a plurality of single-partition cores 31, an insulator 32 of insulating resin for surrounding the single-partition cores 31, a coil 34 wound on an outside of the insulator 32, and a molding part 33 of resin made by means of insert molding for surrounding and supporting the insulator 32 and the coil 34 as one body.

The molding part 33 is in a circular shape, and made each single-partition core 31 exposed outside on each inner/outer surface thereof facing the magnets 12 and 22 of the outer rotor 10 and the inner rotor.

Also, a fixing part 35 is formed at an end of the molding part 33 adjacent to the bearing housing 2a as one body extending toward an inner circumferential direction for being fastened to the bearing housing 2a.

A plurality of fastening holes 35a is formed at an inner end of the fixing part 33 at a predetermined distance, and each fastening hole 35a corresponds to a respective bolt fastening hole 2c of the bearing housing.

The stator 30 should be secured to the shaft 4 with a precise concentricity. For that, as shown in FIG. 3, a plurality of position-determining protrusions is further projectedly formed at a first side of the bolt fastening hole 2c of the bearing housing 2a at a predetermined distance. Preferably, position-determining recesses are formed for making the position-determining protrusions 2d inserted tightly thereto. The position-determining recess may be formed as a through hole passing through the fixing part 35.

Of course, alternatively, the bearing housing 2a may have position-determining recesses, and the fixing part 35 may have position-determining protrusions.

The position-determining protrusion 2d includes a body having a regular diameter, and a guide formed at an end of the body as a corn shape for helping the position-determining protrusion inserted to the position-determining recess 35b more smoothly. Preferably, the position-determining recess 35b and the position-determining protrusion 2d are same in size and appearance for fastening the position-determining protrusion 2d tight enough not to move the position-determining protrusion. That is, the position-determining recess 35b has a portion having the body of the position-determining protrusion 2d inserted thereto, of which a diameter is regular, whereas, a portion having the end of the guide inserted thereto, which is inclined in a corn shape.

Preferably, the position-determining recess 35d of the fixing part 35 is smaller than the fastening hole 35a in diameter.

Also, preferably a portion around the fastening hole of the fixing part 35, more specifically, a portion where the head of the bolt 39 is contacted, is a little bit more projected than the other portions.

As shown in FIG. 4, a plurality of strength enforcement ribs 33a is formed on an outer surface of the molding part 33 for reinforcing strength. Preferably, the strength enforcement rib 33a is extending to an outer surface of the fixing part 35.

An enforcement rib 35c is also formed on an inner surface of the fixing part 35 or enforcing the strength of the fixing part 35 in a range of not interfering with the rotation of the inner rotor 20. Alternatively, a metal enforcement bracket of an annular shape (not shown) is in a close contact with the inner or outer surface of the molding part 33 without the strength enforcement rib 35c to enforcing the strength of the molding part 33.

A connector 37 is formed in the molding part 33 as one body for supplying power to each coil 34 of the stator 30.

Also, a hall sensor securing part 38 is formed as one body in a first side of the molding part 33, which has a hall sensor unit secured thereon for detecting a position of the magnets 22 of the inner rotor 20. An insert hole 38a is formed at the hall sensor securing part 38 for having a sensor terminal 51 of the hall sensor unit 50 inserted thereto.

The insert hole 38a may pass through the inner surface of the molding part 33, or may be recessed enough to be adjacent to the magnets 22 of the inner rotor 20.

Alternatively, unlike the above embodiment of the present invention, the sensor terminal 51 may detect the position of the magnets 12 of the outer rotor 10.

Although not shown in FIGS, preferably a plurality of cooling holes is formed in the molding part 33 to be passed through outside for discharging heat generated when driving the motor outside.

As shown in FIGS. 8 and 9, the core of the stator 30 is a single-partition core 31. The single-partition core 31 is formed in a T-shape. The single-partition cores 31 of a T-shape may be used independently or may be used in a pair facing each other.

The insulator 32 includes a lower insulator 32a and an upper insulator 32b fastened to an upper portion of the lower insulator 32a. The lower and upper insulators 32a and 32b may be fastened in a hook fastening mechanism and alternatively may be formed by insert-molding as one body to cover the single-partition cores 31.

Each of the upper and lower insulators 32a and 32b includes a core holder 32c for holding each single-partition core 31, and a connecting part 32d for connecting each inner end of the core holder together as well as making the insulator a circular shape. Alternatively, unlike the embodiment, the connecting part 32d may connect two outer ends of each core holder 32c to connect the core holders 32 as one body.

The core holder 32c has an inner/outer end thereof opened to expose a shoe 31a of both ends outside.

The coil 34 wound around each core holder 32c in the insulator 32 may be an enameled copper wire.

The stator 30 with the above configurations is manufactured as follows.

First, a single-partition core 31 is seated on each core holder 32c of the lower insulator 32, and the upper insulator 32b is fastened to the upper portion of the lower insulator 32a. Hence, a coil 34 is wound around each core holder 32c of the insulator 32 by means of a winding machine.

Hence, after putting the insulator 32 into a metal mold and injecting resin, the molding part 33 is formed.

Preferably, the melting point of the resin is lower than that of the enamel of the coil 34 as well as that of the insulator material, so that the resin of the molder 33 may not damage the enamel of the coil 34 and the insulator 32.

Unlike the above embodiment, the lower and upper insulators 32 may be not connected each other and independently separated. In that case, since the single-partition core 31 and the insulator are discrete components, there may be an advantageous effect that the coil 34 is wound very fast without interference of the other insulator.

As shown in FIG. 10 illustrating a second embodiment of the stator of the dual rotor type motor, in case that the single-partition core and the insulator are discrete components, the single-partition core is divided into a first single-partition core 131a of a middle portion thereof and a second single-partition core 131b and the insulator 132 is a one body not divided into the lower and upper insulator. Hence, the first and second single-partition cores 131a and 131b are inserted through both opened portions of the insulator 132, and then secured by means of caulking.

The divided surface of the first and second single-partition core 131a and 131b is bended like an L-shape for increasing secured area of the core.

FIG. 11 illustrates a third embodiment of the stator 30, especially a core and an insulator. According to the third embodiment, the stator 30 includes an outer core 231a having a plurality of teeth 231c extending outwardly in a radial direction and a base 231d connecting each inner end of the teeth 231c as one body; and an inner core 231b having a plurality of teeth 231e extending inwardly in a radius direction and a base 231f connecting each outer end of the teeth 231e.

Also, an insulator includes a first insulator 232a surrounding the outer core 231a and a second insulator 232b surrounding the inner core 231b. The first and second insulator 232a and 232b may be formed separately, but preferably is formed as one body. Even in case that the first and second insulator 232a and 232b are formed as one body, preferably a partition wall is provided between the first and second insulator 232a and 232b so as to partition the outer core 231a and the inner core 231b.

The first and second insulator 22a and 232b include each upper and lower insulator to be fastened as one body, as similarly as the insulator of the embodiment described before.

In case that the stator core includes the outer core 231a and the inner core 231b, each core 231a and 231b may be a can type core layered with a plurality of metal plates having appearances of the teeth 231c and 231e, and the base 231d and 231f.

Alternatively, the outer core 231a and the inner core 231b may be made as a spiral core layered with metal plates, with rotating them in a spiral shape, having appearances of the teeth 231c and 231e and the base 231d and 231f.

Otherwise, the outer and inner core 231a and 231b allow a plurality of multi-partition cores layered with a plurality of metal plates formed, and connects those multi-partition cores one another in a circular shape. Of course the metal plates have appearances of the plurality of the teeth 231c and 231e and the base 231d and 231f.

Each stator of the dual rotor type motor described in the above embodiments has the molding part for supporting the core and the insulator at the same time.

Alternatively, without the molding part, only the insulator may support the core.

FIGS. 12 through 14 illustrate a second embodiment of that stator. The structure of an outer rotor 10 and an inner rotor 20 according to the second embodiment of the dual type motor is the same as the structure of the dual rotor type motor according to the first embodiment of the present invention. Thereby, it will be omitted.

The stator 330 of the dual rotor type motor according to the second embodiment of the present invention includes a plurality of single-partition cores 331 as discrete components, an insulator 332 of insulating resin for surrounding the single-partition cores 331, and a coil 334 wound around an outer surface of the insulator 332.

The single-partition core 331 is formed in an approximate I-shape, but may be a T-shape or each pair thereof may face each other.

The insulator 332 includes a lower insulator 332a and an upper insulator 332b fastened to an upper of the lower insulator 332a, the lower and upper insulator 332a and 332b include a core holder 332c for respectively holding the single-partition cores 331, a connector 332d for connecting inner ends of the core holder 332c as well as forming the insulator of a circular shape. Alternatively, the connecting part may connect outer ends of the core holder 332c to connect it as one unit.

The core holder 332c of the lower and upper insulator 332a and 332b has an inner and outer end thereof opened, and both ends of the single-partition core 331 has a shoe 331a thereof exposed outside. The exposed shoes 331a of each single-partition core 331 are facing the magnets 12 and 22 of the outer rotor 10 and inner rotor 20.

A fixing part 335 of an annular shape having an L-shape section is formed as one body on an inner circumferential surface of the upper insulator 332c. Preferably, the fixing part 335 is injection-molded as one body when injection-molding the insulator 332, and alternatively, it may be fastened to the insulator by fastening means such as screws or by bonding.

Also, preferably, a strength reinforcement rib 335c is formed on an inner or an outer surface of the fixing part 335, or both of the inner and outer surfaces thereof for reinforcing the strength of the fixed part. The second embodiment of the present invention suggests that strength reinforcement ribs 335c are formed on the outer surface of the fixing part 335. In case that they are formed on the inner surfaces of the fixing part 335, the strength reinforcement ribs should not interfere with the rotation of the inner rotor 20.

Furthermore, a strength reinforcement bracket (not shown) may be tightly fastened to the inner or outer surface of the fixing part 335 for reinforcing the strength of the fixing part 335.

A plurality of fastening holes 35a each corresponding to the bolt fastening hole 2c of the bearing housing 2a is formed in a predetermined distance. Preferably, a portion around each fastening hole 35a of the fixing part 35, more specifically the portion where a head of the bolt 39 is contacted, is slightly projected from the other portions.

The stator 330 is secured to the shaft 4 with a precise concentricity. For that, a plurality of position-determining protrusions 2d is projected at a first side of the bolt fastening hole 2c in a predetermined distance, and preferably a position-determining recess 335b is formed to have each position-determining protrusion inserted thereto precisely. The position-determining recess 335b may be formed as a through hole passing through the fixing part 335.

Alternatively, a position-determining recess is formed at the bearing housing 2a, and a position-determining protrusion s formed at the fixing part 335.

A connector 337 for supplying power to each coil 334 of the stator 330, and a hall sensor 338 for detecting the position of the magnets 22 of the inner rotor 20 are fastened to the insulator 332.

According to the embodiment of the present invention, the hall sensor 338 is provided for detecting the position of the magnets 22 of the inner rotor 20, but alternatively a hall sensor may be provided for detecting the position of the magnets 12 of the outer rotor 10.

The coil 334 wound around each core holding part 332c of the insulator 332 is preferably an enameled copper wire.

The stator 330 of the motor with the above configurations will be assembled as follows.

First, the single-partition core 331 is seated at each core holding part 332c of the lower insulator 332a, and the upper insulator 332b is secured to the lower insulator 332a. Hence, each coil 334 is wound around each core holding part 332c of the insulator 332 by means of the winding machine.

Once each coil 334 is wound as described above, the connector 337 and a hall sensor 338 is fastened to the insulator. Hence, the fixing part 335 of the insulator 332 is secured to the bearing housing of the washing machine.

At that time, a worker inserts the position-determining recess 335b of the fixing part 335 to the position-determining protrusion 2d of the bearing housing 2a for securing the position of the insulator 332 to the bearing housing 2a precisely. Also, he/she fastens each bolt 339 through each fastening hole 335a of the fixing part 335 and each bolt fastening hole 2c of the bearing housing 2a.

As shown in FIGS. 15 and 16, cores connecting a plurality of cores one another may be used as core of the stator, not the single-partition core.

According to another embodiment of the stator, a core of the stator includes an outer core 431a having a plurality of teeth 431c extending outwardly in a radius direction and a base 431d for connecting inner ends of the teeth one another as one body; and an inner core 431b having a plurality of teeth 431e extending inwardly in a radius direction and a base 431f for connecting outer ends of the teeth 431e one another as one body.

An insulator 432 includes an upper insulator surrounding the outer core 431a and an upper of the inner core 431b, and a lower insulator 432a surrounding the outer core 431a and a lower of the inner core 431b.

A partition wall 432c is formed between an inside and outside of the lower and upper insulator 432a and 432b as one body for separating the outer core 431a from the inner core 431b. The lower and upper insulator 432a and 432b may be fastened in a well-known method of a hook fastening method.

Alternatively, the lower and upper insulator may be formed as one body by means of insert injection-molding for surrounding the outer core 431a and the inner core 431b.

Also, a fixing part 435 is formed in the middle of the upper insulator 432b for securing the lower and upper insulator 432a and 432b to the bearing housing 2a. The fixing part 435 has an L-shaped section as similar as the embodiment described before, and extends inwardly in a radius direction. A plurality of fastening holes 435a corresponding with the bolt fastening holes 2b (see FIG. 12) of the bearing housing 2a (see FIG. 12) is formed at an inner end of the fixing part 435, with passing through the fixing part.

Preferably, a plurality of strength reinforcement ribs 435c is formed at an outer surface of the fixing part 435 for reinforcing the strength of the fixing part.

In case that the stator core is divided into the outer core 431a and the inner core 431b, each core 431a and 431b may be formed as a tube type core layered with a plurality of metal plates having shapes of the teeth 431c and 431e and the base 431d and 431f.

Alternatively, the outer core 431a and the inner core 431b may be each formed as a spiral core spirally layered with metal plates each having the shape of the teeth 431c and 431e and the base 431d and 431f.

Of course, alternatively the outer core 431a and the inner core 431b may be formed as a plurality of multi-partition cores layered with a plurality of metal plates to connect the multi-partition cores one another in a circular shape. In that case, each of the metal plates may have a plurality of teeth 431c and 431e and a base of a circular arc shape 431d and 431f.

A reference number 434 with no description is a coil wound around the insulator 432.

According to the embodiments of the stator described before, the fixing parts 335 and 435 of the insulators 332 and 432 are extending inwardly in a radius direction from a first end of the insulator, but alternatively may be extending outwardly in a radius direction.

On the other hand, according to the embodiments of the motor described before, the stator 30 of the motor is described to be secured to the hearing housing 2a of the washing machine, but alternatively may be secured to the rear surface of the tub 2 (see FIG. 1) and also may be secured to other portions concentrically with the shaft 4.

As was described hereinabove, the output of the motor may be enhanced without enlarging the size and weight of the motor, because the inner rotor and the outer rotor are provided in the inner portion and outer portion of the stator according to the present invention.

Furthermore, according to the present invention it is easy to secure the stator to an appliance such as a washing machine, because the core of the stator and the insulator are supported by the molding part.

Still further, in case that the molding part is surrounding the core of the stator, the insulator and the coil, water-proof efficiency of the stator may be enhanced. Thus, when applied to the appliances such as a washing machine using water, there is little short circuit caused by water on the stator and durability of the stator also may be enhanced.

Still further, in case the plurality of the cooling hole parts is formed, air for cooling is ventilated smoothly to radiate the heat of the motor more efficiently even in rotating/reverse-rotating the shaft of the motor by agitating.

Still further, according to the present invention the inner space of the inner rotor may be cooled efficiently, because air can flow into the inner and outer side of the inner rotor through the intervals on the portion having the outer rotor and the inner rotor fastened thereto by the embossing of the base of the outer rotor.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As described before, the dual rotor type motor according to the present invention may be applied to a drum type washing machine for great efficiency, and also may be applied to other appliances such as an air conditioner in the same method or similar ones.

The invention claimed is:

1. A dual rotor type motor comprising:
a shaft rotatably provided in a motor securing part;
a rotor assembly rotated with a center thereof fastened to the shaft, the rotor assembly comprising an outer rotor spaced from the center of the shaft a predetermined distance with magnets secured along a circumferential direction, and an inner rotor provided in an inside of the outer rotor at a predetermined distance with magnets secured along a circumferential direction; and
a stator comprising a core made of metal, an insulator of an insulating material for surrounding the core so as to expose a first surface and a second surface of the core a coil wound on an outer surface of the insulator, and a fixing part for securing the insulator to the motor securing part, the stator provided between the outer rotor and the inner rotor so that the exposed first and second surfaces of the core are spaced from and face the magnets of the outer and inner rotors respectively, wherein the core comprises:
an outer core comprising a plurality of teeth extending in a radius direction, each of the teeth of the outer core including a first surface facing a respective one of the magnets of the outer rotor, and a base for connecting the teeth of the outer core to one another, and
an inner core comprising a plurality of teeth extending in a radius direction, each of the teeth of the inner core including a second surface facing a respective one of the magnets of the inner rotor, and a base for connecting the teeth of the inner core to one another.

2. The dual rotor type motor of claim 1, wherein each core is a single-partition core as a discrete component.

3. The dual rotor type motor of claim 2, wherein the single-partition core has a T-shape.

4. The dual rotor type motor of claim 2, wherein the single-partition core has an I-shape.

5. The dual rotor type motor of claim 2, wherein the single-partition core is divided into at least two partitions and connected one another as one body.

6. The dual rotor type motor of claim 1, wherein the outer core and the inner core are formed each as a core layered with a plurality of metal plates having shapes of the teeth and the bases.

7. The dual rotor type motor of claim 1, wherein the outer core and the inner core have multi-partition cores layered with a plurality of metal plates having a plurality of teeth and a circular base connecting the plurality of the teeth and the multi-partition cores are connected as a circular shape.

8. The dual rotor type motor of claim 2, wherein the insulator is formed as a discrete component for holding each core respectively.

9. The dual rotor type motor of claim 2, wherein the insulator is connected as one body.

10. The dual rotor type motor of claim 1, wherein the insulator comprises a first insulator for holding some part of the core, and a second insulator connected in a first side of the first insulator for holding the other part of the core.

11. The dual rotor type motor of claim 1, wherein the insulator surrounding the core comprises a first insulator for surrounding the outer core, and a second insulator for surrounding the inner core.

12. The dual rotor type motor of claim 1, wherein the insulator surrounding the core comprises an upper insulator for surrounding the upper portions of the outer core and the inner core, and a lower insulator for surrounding lower portions of the outer core and the inner core.

13. The dual rotor type motor of claim 12, wherein a partition wall is formed in the middle of the upper and lower insulator for separating the outer core from the inner core.

14. The dual rotor type motor of claim 1, wherein the insulator surrounding the core comprises a first insulator for surrounding the outer core, a second insulator for surrounding the inner core, and a partition wall provided between the first and the second insulator for separating the outer core from the inner core.

15. The dual rotor type motor of claim 1, wherein the fixing part is injection-molded in the insulator.

16. The dual rotor type motor of claim 1, wherein the fixing part extends inwardly in a radius direction from a first end of the insulator.

17. The dual rotor type motor of claim 1, wherein the fixing part extends outwardly in a radius direction from a first end of the insulator.

18. The dual rotor type motor of claim 1, wherein a plurality of fastening holes is formed at the motor securing part and a plurality of fastening holes corresponding to the fastening holes of the motor securing part is formed at the fixing part, and a bolt is fastened through each fastening hole of the motor securing part and each fastening hole of the fixing part to secure the molding part of the stator to the motor securing part, and a portion of the fastening hole of the fixing part where a head of the bolt is adjacent is more projected than the other portions thereof.

19. The dual rotor type motor of claim 1, wherein:
the protrusion comprises a body having a regular diameter, and a guide part formed at an end of the body with a slope in a cone shape that terminates in said rounded bottom, and the recess comprises a horizontal part with a regular diameter corresponding to the body of the protrusion, and an inclined part corresponding to the complementary shaped surface which is inclinedly formed at an end of the horizontal part in a corn shape.

20. The dual rotor type motor of claim 1, wherein the position-determining recess is smaller in diameter than the fastening hole of the fixing part fastened by the bolt.

21. The dual rotor type motor of claim 1, wherein a plurality of strength reinforcement ribs is formed at the fixing part for reinforcing the strength of the fixing part.

22. The dual rotor type motor of claim 1, further comprising
a metal strength reinforcement bracket provided in the fixing part for reinforcing the strength of the fixing part.

23. The dual rotor type motor of claim 1, further comprising
a cooling hole part formed outside of the outer surface of the inner rotor comprising a plurality of cooling holes passing through the outer rotor for ventilating air there through, and a guide part projectedly formed at the rim of the cooling hole for guiding air in the clockwise/counterclockwise rotation of the rotor.

24. The dual rotor type motor of claim 23, wherein the guide part is provided as one body with the outer rotor and formed at the rim of the cooling hole by lancing and perpendicularly projected from the surface of the outer rotor.

25. The dual rotor type motor of claim 23, wherein at least one of the guide parts is incinedly projected toward an inside of the cooling hole.

26. The dual rotor type motor of claim 23, wherein at least one of the guide parts is rounded toward the inside of the cooling hole.

27. The dual rotor type motor of claim 23, wherein the guide part is projected toward an inside of the outer rotor.

28. The dual rotor type motor of claim 23, wherein the guide part is projected toward an outside of the outer rotor.

29. The dual rotor type motor of claim 23, wherein embossing is projectedly formed at the outer rotor for reinforcing the strength, and predetermined space, as high as the embossing, is formed between the surface of the outer rotor and the surface of the inner rotor.

30. The dual rotor type motor of claim 1, wherein inner ends of the insulator are connected one another as one body.

31. The dual rotor type motor of claim 1, wherein outer ends of the insulator are connected one another as one body.

32. The dual rotor type motor of claim 1, wherein the motor securing part is included in an appliance.

33. The dual rotor type motor of claim 1, wherein a clearance is formed between a bottom of the inner rotor and a bottom of the outer rotor and communicates with inner spaces of the inner and outer rotors.

34. The dual rotor type motor of claim 33, wherein the outer rotor has at least one embossing projecting from the bottom thereof and wherein the bottom of the inner rotor is disposed on the at least one embossing to form the clearance.

35. The dual rotor type motor of claim 33, wherein one or more cooling holes are formed in the outer rotor and wherein the clearance allows air to flow from one or more of the cooling holes for cooling at least the inner rotor.

36. The dual rotor type motor of claim 35, wherein the outer rotor has at least one embossing projecting from the bottom thereof and wherein the bottom of the inner rotor is disposed on the at least one embossing to form the clearance.

37. A dual rotor type motor comprising:
a shaft rotatably provided in a motor securing part of an appliance;
a rotor assembly rotating with a center thereof fastened to the shaft, the rotor assembly comprising an outer rotor spaced from the center of the shaft a predetermined distance with magnets secured along a circumferential direction, and an inner rotor provided in an inside of the outer rotor at a predetermined distance with magnets secured along a circumferential direction; and
a stator comprising a core made of metal, an insulator of an insulating material for surrounding the core so as to expose a first surface and a second surface of the core, a coil wound on an outer surface of the insulator, a molding part of insulating material for surrounding the insulator and the coil by insert molding as one body to expose the first and second surface of the core in a state of the insulator being provided in a circular shape, and a fixing part secured to the motor securing part, the stator provided between the outer rotor and the inner rotor so that the exposed first and second surfaces of the core are spaced from and face the magnets of the outer and inner rotors respectively, wherein the core comprises:
an outer core comprising a plurality of teeth extending in a radius direction, each of the teeth of the outer core including a first surface facing a respective one of the magnets of the outer rotor, and a base for connecting the teeth of the outer core to one another, and
an inner core comprising a plurality of teeth extending in a radius direction, each of the teeth of the inner core including a second surface facing a respective one of the magnets of the inner rotor, and a base for connecting the teeth of the inner core to one another.

38. The dual rotor type motor of claim 37, further comprising a strength reinforcement part for reinforcing the strength of the molding part is a plurality of strength reinforcement ribs formed at an outer surface of the molding part as one body.

39. The dual rotor type motor of claim 37, wherein a connector is formed at the molding part as one body for supplying power to the coil.

40. The dual rotor type motor of claim 37, wherein a hall sensor is provided at the molding part for detecting the position of the magnet of the rotor assembly.

41. The dual rotor type motor of claim 40, wherein the hail sensor detects the position of the magnet of the inner rotor of the rotor assembly.

42. The dual rotor type motor of claim 40, wherein the hail sensor detects the position of the magnet of the outer rotor of the rotor assembly.

43. The dual rotor type motor of claim 37, wherein the coil is an enameled copper wire.

44. The dual rotor type motor of claim 43, wherein the molding part is made of resin having a melting point thereof lower than the melting points of the enamel of the coil and of the insulator.

45. The dual rotor type motor of claim 37, wherein at least one cooling hole is passed through the fixing part.

46. The dual rotor type motor of claim 37, wherein a clearance is formed between a bottom of the inner rotor and a bottom of the outer rotor and communicates with inner spaces of the inner and outer rotors.

47. The dual rotor type motor of claim 46, wherein one or more cooling holes are formed in the outer rotor and wherein the clearance allows air to flow from one or more of the cooling holes for cooling at least the inner rotor.

* * * * *